United States Patent
Seitz

(10) Patent No.: US 11,184,330 B2
(45) Date of Patent: Nov. 23, 2021

(54) AUTOMATED SECURED LOGIN FOR ROBOT PROCESS AUTOMATION APPLICATIONS

(71) Applicant: International Business Machines Corporation, Armonk, NY (US)

(72) Inventor: Uwe Seitz, Buchen (DE)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 16/812,838

(22) Filed: Mar. 9, 2020

(65) Prior Publication Data

US 2021/0281547 A1     Sep. 9, 2021

(51) Int. Cl.
*H04L 29/06* (2006.01)

(52) U.S. Cl.
CPC ...... *H04L 63/0407* (2013.01); *H04L 63/0823* (2013.01); *H04L 63/0876* (2013.01); *H04L 63/20* (2013.01)

(58) Field of Classification Search
CPC . H04L 63/0407; H04L 63/0823; H04L 63/20; H04L 63/0876
See application file for complete search history.

(56) References Cited

U.S. PATENT DOCUMENTS

| | | | |
|---|---|---|---|
| 8,522,212 B1 * | 8/2013 | Bhatnagar | G06F 11/3684 717/125 |
| 8,751,629 B2 * | 6/2014 | White | G06F 21/577 709/224 |
| 9,817,967 B1 | 11/2017 | Sanjeev | |
| 2004/0117170 A1 * | 6/2004 | Walsh | H04L 63/083 703/17 |
| 2009/1572211 | 6/2009 | Sip | |

(Continued)

FOREIGN PATENT DOCUMENTS

| | | |
|---|---|---|
| CN | 101359225 A | 2/2009 |
| CN | 108189029 A | 6/2018 |
| EP | 3435664 A1 | 1/2019 |

OTHER PUBLICATIONS

Dutta et al., Simulated User Bots: Real Time Testing of Insider Threat Detection Systems, May 2018, IEEE Security and Privacy Workshops, pp. 228-236 (Year: 2018).*

(Continued)

*Primary Examiner* — Kenneth W Chang
(74) *Attorney, Agent, or Firm* — Michael A. Petrocelli

(57) ABSTRACT

The present disclosure includes execution of an application process on a first computer system, where the first computer system is arranged within a first security zone. Access credentials for the application process may be stored in a storage device, where the storage device is arranged within a second security zone. The application process may interact with a further application process. The further application process may be executed on a third computer system, where the further application process is controlled by a graphical user interface of the further application process. An application robot may be executed on the first computer system. The application robot may execute the application process. Further, a login into the first computer system from a second computer system may be executed for gaining access to the application process using the access credentials.

18 Claims, 3 Drawing Sheets

(56) References Cited

U.S. PATENT DOCUMENTS

| | | | |
|---|---|---|---|
| 2015/0032436 A1* | 1/2015 | van de Kamp | G06F 11/3414 |
| | | | 703/13 |
| 2017/0076089 A1* | 3/2017 | Turgeman | H04L 63/08 |
| 2019/0124100 A1 | 4/2019 | Shannon | |
| 2019/0130094 A1 | 5/2019 | Votaw | |
| 2019/0155225 A1 | 5/2019 | Kothandaraman | |
| 2019/0286474 A1 | 9/2019 | Sturtivant | |
| 2019/0303584 A1* | 10/2019 | Yang | G06F 21/564 |

OTHER PUBLICATIONS

Szymczyk, Miroslaw, Detecting Botnets in Computer Networks Using Multi-Agent Technology, Jul. 2009, Fourth International Conference on Dependability of Computer Systems, pp. 192-201 (Year: 2009).*

International Search Report and Written Opinion, International Application No. PCT/IB2021/051680, International Filing Date Mar. 1, 2021, 8 pages.

Seitz, et al., "Automated Secured Login for Robot Process Automation Applications", International Application No. PCT/IB2021/051680, International Filing Date Mar. 1, 2021, 37 pages.

* cited by examiner

AUTOMATED SECURED LOGIN FOR ROBOT PROCESS AUTOMATION APPLICATIONS

BACKGROUND

The present invention relates to the field of automating processes performed by a user on a workstation.

Usually an automated process can be performed by a computer system arranged within a service network. To start the automated process, the user typically needs to log into the service network from a company network, wherein the service network is arranged outside the company network. The company network may be a target for hackers. Therefore, security issues related to the company network may also affect security issues related to the service network. The service network may be used for several different clients serving several automated processes. Therefore, if a single client is compromised, there is a risk that the service network may be compromised as well, and data processed by the several automated processes may be spied out.

SUMMARY

Various embodiments provide a computer implemented method, a computer program product and a computer system as described by the subject matter of the independent claims. Advantageous embodiments are described in the dependent claims. Embodiments of the present invention can be freely combined with each other if they are not mutually exclusive.

In one aspect, the invention relates to a computer implemented method. The method comprises: executing an application process on a first computer system, the first computer system being arranged within a first security zone; storing access credentials for the application process in a storage device, the storage device being arranged within a second security zone and the first security zone and the second security zone being communicatively coupled via a firewall, wherein the first security zone is communicatively coupled with a third security zone and the application process interacts with a further application process, executing the further application process on a third computer system, the further application process being controlled by a graphical user interface of the further application process, the third computer system being arranged within the third security zone; executing an application robot on the first computer system, wherein the first computer system is communicatively coupled with the third computer system, the application robot executing the application process, wherein executing the application process comprises simulating steps of a first imaginary user using the graphical user interface of the further application process; executing a login into the first computer system from a second computer system for getting access to the application process using the access credentials, the second computer system being arranged within the second security zone, wherein by getting access to the application process the application process can be initialized.

In another aspect, the invention relates to a computer program product comprising a computer-readable storage medium having computer-readable program code embodied therewith, the computer-readable program code configured to implement the features of the method according to preceding embodiments.

In another aspect according to the present invention, a computer program product comprises a computer readable storage medium having program instructions embodied therewith, the program instructions executable by a computer to cause the computer to: execute, by the computer, an application process on a first computer system, the first computer system being arranged within a first security zone; store, by the computer, access credentials for the application process in a storage device, the storage device being arranged within a second security zone and the first security zone and the second security zone being communicatively coupled via a firewall, wherein the first security zone is communicatively coupled with a third security zone and the application process interacts with a further application process, executing the further application process on a third computer system, the further application process being controlled by a graphical user interface of the further application process, the third computer system being arranged within the third security zone; execute, by the computer, an application robot on the first computer system, wherein the first computer system is communicatively coupled with the third computer system, the application robot executing the application process, wherein executing the application process comprises simulating steps of a first imaginary user using the graphical user interface of the further application process; and execute, by the computer, a login into the first computer system from a second computer system for getting access to the application process using the access credentials, the second computer system being arranged within the second security zone, wherein by getting access to the application process the application process can be initialized.

In another aspect, the invention relates to a system, the system including a computer system comprising: a computer processor, a computer-readable storage medium, and program instructions stored on the computer-readable storage medium being executable by the processor, to cause a computer system to: execute an application process on a first computer system, the first computer system being arranged within a first security zone; store access credentials for the application process in a storage device, the storage device being arranged within a second security zone and the first security zone and the second security zone being communicatively coupled via a firewall, wherein the first security zone is communicatively coupled with a third security zone and the application process interacts with a further application process, executing the further application process on a third computer system, the further application process being controlled by a graphical user interface of the further application process, the third computer system being arranged within the third security zone; execute an application robot on the first computer system, wherein the first computer system is communicatively coupled with the third computer system, the application robot executing the application process, wherein executing the application process comprises simulating steps of a first imaginary user using the graphical user interface of the further application process; and execute a login into the first computer system from a second computer system for getting access to the application process using the access credentials, the second computer system being arranged within the second security zone, wherein by getting access to the application process the application process can be initialized.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
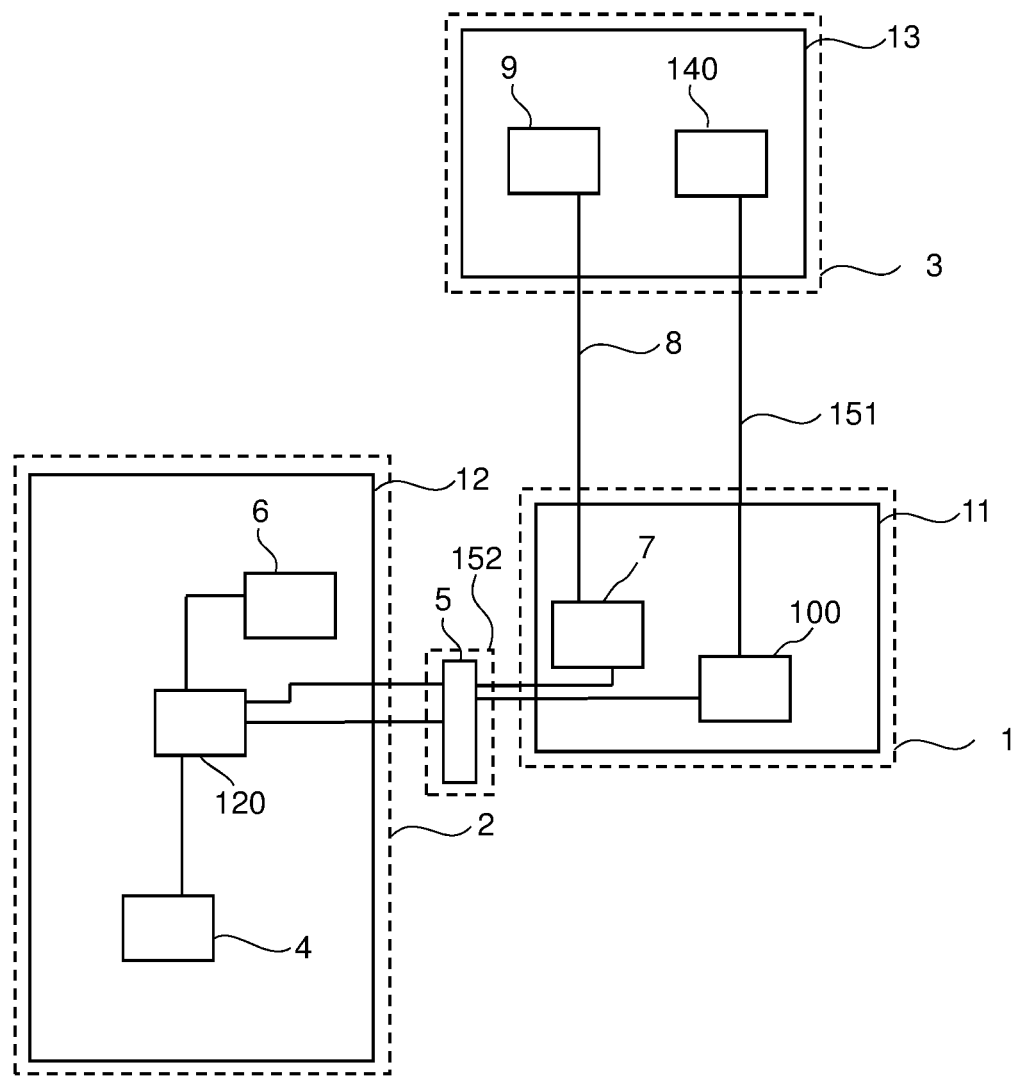
FIG. 1 depicts a block diagram of a computer system comprising a first computer system, a second computer system and a third computer system.

The description of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may prevent that the access credentials need to be stored within the first security zone in order to perform a login into the first computer system. This may reduce a risk that the access credentials may be spied out by compromising the third security zone and entering the first security zone via the third security zone. Therefore, the present method may prevent that a hacker who entered the third security zone may log into the first computer system, start the application process and get access to data being processed on the third computer system by getting access to the graphical user interface (GUI) of the further application process.

The term "computer system" as used herein refers to an entity being able to execute a computer-readable program code. For example, a "computer system" may be a virtual computer system or a computer system with hardware components.

The term "further application process" as used herein refers to a computer-controlled process processing data within the third security zone. The data may be industrial data, such as values of quantities of products, values of quantities of materials, etc. For example, the further application process may be any application process of the computer program product.

The term "application process" as used herein refers to a computer-controlled process, wherein executing the application process provokes an automated controlling of the GUI of the further application process. The application process may be been programmed using any type of computer program products used in the field of robot process automation. The application process may be performed by an executable computer program product on the first computer system. The executable computer program product may be gained by compiling a computer code written by a computer program product used in the field of robot process automation.

The term "access credentials for the application process" as used herein refers to any information necessary to gain access to the application process, such as a password or a certificate.

The first security zone may be formed by a first network consisting of the first computer system and several further first computer systems. Within the first network the computer systems of the first network may be accessible from outside the first network via a first secure connection, such as an SSH (Secure Shell) tunnel, a VPN (Virtual Private Network)-connection or any type of encrypted connection.

The second security zone may be formed by a second network consisting of the second computer system and several further second computer systems. Within the second network the computer systems of the second network may be accessible from outside the second network via a second secure connection, such as a VPN-connection or any type of encrypted connection.

The third security zone may be formed by a third network consisting of the third computer system and several further third computer systems. Within the third network the computer systems of the third network may be accessible from outside the third network via a third secure connection, such as a VPN-connection or any type of encrypted connection.

The term "firewall" as used herein refers to any hardware and/or software of the first and/or second computer system or settings of the hardware and/or software of the first and/or second computer system enabling a restriction of a data traffic between the first security zone and the second security zone, preferably between the first computer system and the second computer system. For example, the firewall may be configured such that the access credentials stored in the storage device are not accessible from the first security zone. The firewall may be arranged within the first security zone, within the second security zone or between the first security zone and the second security zone.

According to one embodiment, the firewall is configured such that the login on the first computer system can only be executed from the second computer system. Such a configuration of the firewall may further reduce the risk that the application process may be compromised by any computer system being arranged within the first security zone or another security zone except from the second security zone.

According to one embodiment, the login is performed by a login robot, the login robot simulating steps of a second imaginary user executing the login into the first computer system from the second computer system. This embodiment enables the login to be automated by using the login robot. If the login is automated, more complex access credentials may be used compared to an embodiment wherein the login is performed manually, e.g. by a first user using a desktop being located within the second security zone. Furthermore, simulating steps of a second imaginary user executing the login into the first computer system may replace the first user. In addition to that, the login robot may be initialized automatically via an exemplary run script.

The term "robot" as used herein refers to an entity comprising an exemplary computer system and an exemplary computer program product being executed on the exemplary computer system, wherein executing the exemplary computer program product results in simulating actions an imaginary user is executing on an interface of an exemplary application process. The exemplary application process may be executed on the exemplary computer system or a further exemplary computer system. The interface may be an exemplary GUI of the exemplary application process or an exemplary command-oriented shell of the exemplary computer system or the further exemplary computer system, wherein entry data entered via the exemplary GUI or the exemplary command-oriented shell may be processed by the exemplary application process. Referring to the application robot, the exemplary application process may be the further application process. Referring to the login robot, the exemplary application process may be an application for executing the login, for example a computer program product supporting a remote desktop application.

According to one embodiment, the application process comprises a GUI. The graphical user interface of the application process may provide an easy usage of the application process compared to a usage via a command-oriented shell.

According to one embodiment, the application process comprises the graphical user interface and the login is performed by a login robot, the login robot simulating steps of a second imaginary user executing the login into the first computer system from the second computer system, the login robot obtaining access to the GUI of the application process and initializing the application process using the GUI of the application process. This embodiment may enable the login to be automated by using the login robot in case the application process comprises the GUI.

According to one embodiment, the method further comprises establishing a secure connection between the second computer system and the first computer system and providing access information to the first computer system using the secure connection, the access information providing access to the further application process and in response to receiving the access information, the application robot simulating the steps of the first imaginary user using the GUI of the further application process performing a login into the further application process using the access information. According to this embodiment, within the first security zone the access information can only be received from the second security zone via the secure connection. This embodiment may use the second security zone as a source of the access information. This may prevent that the access information needs to be stored within the first security zone. This may reduce the risk that the further application process may be compromised by any computer system being arranged within the first security zone. This may reduce the risk that confidential data being processed by the further application may be spied out. The secure connection may comprise such an SSH tunnel, a VPN-connection or any type of encrypted connection.

According to one embodiment, the first computer system is realized as a dedicated application server. The dedicated server may be configured for only executing the application process and the further application process. This may give the possibility to optimize software and hardware components of the first computer system regarding the application process and the further application process.

According to one embodiment, the third computer system is realized as a non-dedicated application server. According to that embodiment, the third computer system is configured for executing not only the further application process but at least another application process. This may provide a flexible implementation of the present method.

According to one embodiment, the second security zone and the third security zone are only communicatively coupled indirectly via the first security zone. This may reduce the risk that the second security zone may be compromised if the third security zone is compromised.

According to one embodiment, an interactive login into the first computer system being executed from the first security zone is disabled. The term "being executed from the first security zone" as used herein refers to executing the interactive login from a device that is arranged within the first security zone. By disabling the interactive login from the device arranged within the first security zone the risk that the first computer system may be compromised may further be reduced. The interactive login may comprise an interactive login via a command-oriented shell of first computer system or a GUI of the first computer system or the GUI of the application process.

According to one embodiment, executing the login and executing the application robot are scheduled in a queue via a run script, the run script being executed within the first security zone, wherein executing the run script provides an execution of the login followed by an execution of the application robot. This may enable starting the login from outside the second security zone, e.g. from the first security zone. Furthermore, scheduling executing the login and executing the application robot in sequence via the run script may prevent that the execution of the application process may be started before the login has occurred. This may prevent that the application robot may be initialized without executing the login. The term "run script" as used herein refers to any software enabling an execution of the login and an execution of the application robot in a scheduled way. The run script may be configured as a shell script, a computer-readable program code or as a stored ordered list.

According to one embodiment, the method further comprises executing a second application robot on a fourth computer system, the fourth computer system being arranged within the first security zone and communicatively coupled with a fifth computer system, the second application robot executing a second application process, wherein executing the second application process comprises using a GUI of a second further application process and simulating steps of a further first imaginary user using the GUI of the second further application process, the second further application process being operated on the fifth computer system and the second further application process being controlled by the GUI of the second further application process, the fifth computer system being arranged in the third security zone. This embodiment of the method further comprises executing a login into the fourth computer system for getting access to the second application process, wherein by getting access to the second application process the second application process can be initialized, wherein the login into the fourth computer system is performed by a second login robot from the second security zone using second access credentials, the second login robot simulating steps of a further second imaginary user executing the login into the fourth computer system, wherein executing the login into the first computer system and executing the login into the fourth computer system are scheduled via a run script and the second access credentials are stored within the second security zone.

This embodiment may provide a flexible implementation of the present method. For example, not only the execution of the application robot but also the execution of the second application robot may be initiated automatically via the run script. By that, the further application process and the second further application process may be performed automatically in a queue or in parallel via the run script. This may enhance the capabilities of automation of several processes and may reduce the amount of manpower.

According to one embodiment, the method further comprises starting the login robot via a jump server, the jump server being arranged within the first security zone and communicatively coupled by a further secure connection between the first security zone and the third security zone and being accessible from the third security zone via the further secure connection for starting the login robot. The further secure connection may comprise an SSH tunnel or a VPN connection. Using the further secure connection may provide a secure way to log into the jump server from the third security zone. Starting the login robot via the jump server may enable a user starting the further application from the third security zone via the further secure connection without the need of getting access to the first computer system. This is an advantageous embodiment, as the risk of compromising the first computer system via the third security zone may still be low whereas starting the further application process from the third security zone may be possible for the user.

According to one embodiment, the method further comprises controlling the run script via the jump server, the jump server being arranged within the first security zone and communicatively coupled by the further secure connection between the first security zone and the third security zone and being accessible from the third security zone via the further secure connection for controlling the run script via the jump server. This may enable to start the run script from the third security zone without the need of getting access to the first computer system. This may be a further advantageous embodiment, as the risk of compromising the first computer system via the third security zone may still be low whereas starting the run script from the third security zone may be possible.

According to one embodiment, the method further comprises storing the access information cryptographically secured within the second security zone. This may prevent the risk that the access information may be spied out.

According to one embodiment, the method further comprises executing a login into the login robot using login robot access credentials, wherein the login robot is only accessible by using the login robot access credentials and the login robot access credentials are stored within the second security zone. This embodiment may enhance the security of a usage of the login robot. As a result, this embodiment may enhance the security of the usage of the application robot because the application robot may only be executed by using the access credentials and the login robot access credentials according to that embodiment.

FIG. 1 is block diagram of a computer system 10. The computer system 10 is suited for implementing method steps as involved in the disclosure. The computer system comprises at least a first computer system 100, a second computer system 120 and a third computer system 140.

Figure 2:
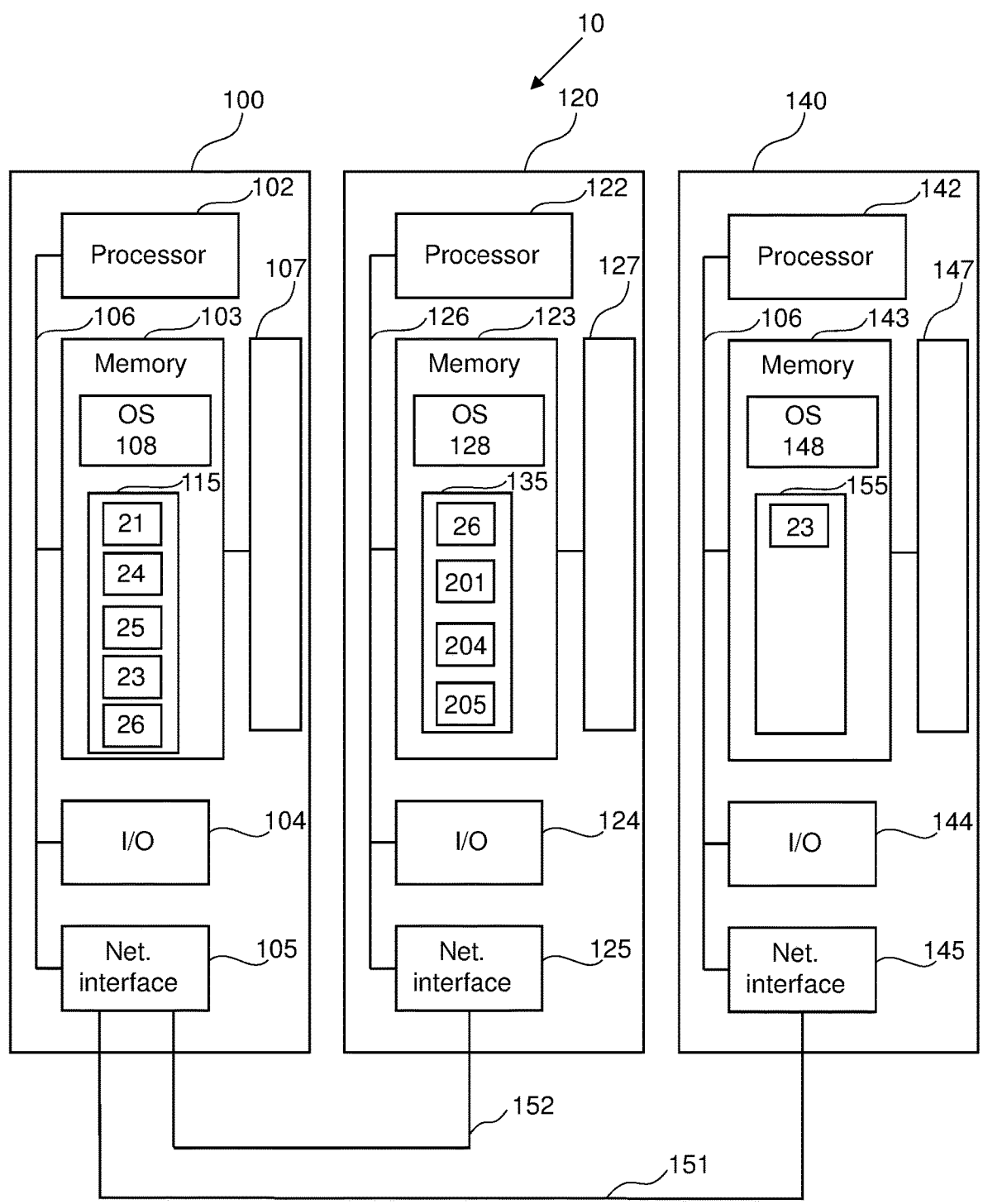
FIG. 2 shows a detailed block diagram of the first computer system, the second computer system and the third computer system shown in FIG. 1.

FIG. 2 shows the first computer system 100, the second computer system 120 and the third computer system 140 in greater detail. The first computer system 100 may include a first processor 102, a first memory 103, a first I/O (input/output) circuitry 104 and a first network interface 105 coupled together by a first bus 106.

The first Processor 102 may represent one or more processors (e.g. microprocessors). The first memory 103 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the first memory 103 may have a distributed architecture, where various components are situated remote from one another, but may be accessed by the first processor 102.

The first memory 103 in combination with a first persistent storage device 107 may be used for local data and instruction storage. The first storage device 107 includes one or more persistent storage devices and media controlled by the first I/O circuitry 104. The first storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The first memory 103 may include one or more separate programs, each of which comprises an ordered listing of executable instructions for implementing logical functions, notably functions involved in examples. The software in the first memory 103 may also typically include a first suitable operating system (OS) 108. The first OS 108 essentially controls the execution of other computer programs for implementing at least part of methods as described herein.

Second computer system 120 may include a second processor 122, a second memory 123, a second I/O circuitry 124 and a second network interface 125 coupled together by a second bus 126.

The second Processor 122 may represent one or more processors (e.g. microprocessors). The second memory 123 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the second memory 123 may have a distributed architecture, where various components are situated remote from one another, but may be accessed by the second processor 122.

The second memory 123 in combination with a second persistent storage device 127 may be used for local data and instruction storage. The second storage device 127 includes one or more persistent storage devices and media controlled by the second I/O circuitry 124. The second storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The second Memory 123 may include one or more separate programs, each of which comprises an ordered listing of executable instructions for implementing logical functions, notably functions involved in examples. The software in the second memory 123 may also typically include a second suitable operating system (OS) 128. The second OS 128 essentially controls the execution of other computer programs for implementing at least part of methods as described herein.

Third computer system 140 may include a third processor 142, a third memory 143, a third I/O circuitry 144 and a third network interface 145 coupled together by a third bus 146.

The third Processor 142 may represent one or more processors (e.g. microprocessors). The third memory 143 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the third memory 143 may have a distributed architecture, where various components are situated remote from one another, but may be accessed by the third processor 142.

The third Memory 143 in combination with a third persistent storage device 147 may be used for local data and instruction storage. The third storage device 147 includes one or more persistent storage devices and media controlled by the third I/O circuitry 144. The third storage device 147 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The third Memory 143 may include one or more separate programs, each of which comprises an ordered listing of executable instructions for implementing logical functions, notably functions involved in examples. The third software in memory 143 may also typically include a third suitable operating system (OS) 148. The third OS 148 essentially controls the execution of other computer programs for implementing at least part of methods as described herein.

The first computer system 100, the second computer system 120 and the third computer system 140 may be independent computer hardware platforms. Every computer system 100, 120 and 140 may be responsible for managing its own copies of the data.

The first computer system 100 may communicate with the third computer system 140 via a first connection 151 and with the second computer system 140 via a second connection 152 via corresponding network interfaces 105, 125, 145. The first connection 151 may provide the above mentioned third secure connection. The second connection 152 may comprise a local area network (LAN) or a general wide area network (WAN). The second connection 152 may provide the above mentioned first secure connection and second secure connection. The first connection 151 may comprise a general wide area network (WAN) and/or a public network, for example the Internet. As shown in FIG. 2, there may be no hardware connection between the second computer system 120 and the third computer system 140. Though, the second computer system 120 may only be indirectly communicatively coupled with the third computer system 140 via the first security zone. Hence, the second security zone 2 and the third security zone 3 are only indirectly communicatively coupled via the first security zone 1.

The first computer system 100 may be arranged within a first security zone 1. The second computer system 120 may be arranged within a second security zone 2. The third computer system 140 may be arranged within a third security zone 3. The first security zone 1, the second security zone 2 and the third security zone may each comprise further devices, for example storage devices or further computer systems, not shown in FIG. 1. The first security zone 1 may be communicatively coupled with the third security zone 3, for example via the first connection 151.

The first computer system 100 and the further devices of the first security zone 1 may form a first computer network 11. The second computer system 120 and the further devices of the second security zone 2 and the third computer system 140 and the further devices of the third security zone 3 may form a second computer network 12 and a third computer network 13 respectively. As shown in FIG. 1, the second network 12 may comprise a storage device 4, which may be arranged within the second security zone 2. The first security zone 1 and second security zone 2 may be communicatively coupled via the second connection 152, the second connection 152 preferably comprising a firewall 5. FIG. 1 shows the firewall 5 being arranged between the first security zone 1 and the second security zone 2.

The third network 13 may be regarded as a company network as described above and the first network 11 may be considered as a serving network, which may serve an execution of a process to the third network 13. The second network 12 may be considered as a secure network providing access data for the process executed within the first network 11.

The computer system 10 may be configured for functions such as executing the an application process on the first computer system 100, in the following referred to as first function, storing access credentials for the application process in the storage device 4, in the following referred to as second function, executing a further application process, in the following referred to as third function, executing an application robot on the first computer system 100, in the following referred to as fourth function, simulating steps of a first imaginary user using a GUI of a further application process, in the following referred to as fifth function, executing a login into the first computer system 100 from the second computer system 120 for getting access to the application process, in the following referred to as sixth function.

Furthermore, the computer system 10 may be configured for functions such as executing a login automation process on the second computer system 120, in the following referred to as function 201, storing login robot access credentials for the login automation process in the storage device 4, in the following referred to as function 202, executing a remote login application, in the following referred to as function 203, executing a login robot on the second computer system 120, in the following referred to as function 204, simulating steps of a second imaginary user executing the login into the first computer system 100 from the second computer system 120, in the following referred to as function 205, executing a login into the second computer system 120 for getting access to the login automation process, in the following referred to as function 206.

The computer system 10 may perform the first, second, third, fourth, fifth and sixth function by executing a first program 21, a second program 22, a third program 23, a fourth program 24, a fifth program 25 and a sixth program 26 respectively.

Similarly, the computer system 10 may perform function 201, function 202, function 203, function 204, function 205 and function 206 by executing a program 221, a program 222, a program 223, a program 224, a program 225 and a program 226 respectively.

The term "program" as used herein refers to a set of instructions which contains commands to provoke actions performed at least by one of the processors 102, 122, 142 when at least one of the processors 102, 122, 142 may read the commands. The set of instructions may be in the form of a computer-readable program, routine, subroutine or part of a library, which may be executed by at least one of the processors 102, 122, 142 and/or may be called by a further program being executed by at least one of the processors 102, 122, 142. Preferably the programs 21, 22, 23, 24, 25, 26, 221, 222, 223, 224, 225, 226 may be executable programs which are compiled according to a type of hardware platform of the computer systems 100, 120, 140 respectively.

The first memory 103 may comprise a space for storing the first program 21; the space hereinafter referred to as first function memory 115. The first program 21 may be generated by using at least a subroutine, a library and/or a module of one of the above mentioned computer program products known in the field of robot process automation, in the following referred to as robot process automation programs.

The OS 108 may comprise an executable program code of one of the robot process automation programs for executing the first program 21.

Furthermore, the first function memory 115 may comprise the fourth program 24. The first processor 102 may execute the fourth program 24. Executing the fourth program 24 may comprise setting up a virtual workstation on the first memory 103, starting and executing the application robot on the virtual workstation, wherein executing the application robot may comprise executing the application process by the application robot. In order to execute the application process, the application robot may execute the first program 21. To realize this, the virtual workstation, and by that the first processor 102, may execute the first program 21. The application robot may be regarded as an application entity comprising the virtual workstation and the first program 21 being executed on the virtual workstation. The virtual workstation may be a copy of a workstation of a user of the third network 13. According to one example, the fourth program 24 may be in the form a shell script or any other set of instructions for setting up the virtual workstation, starting and executing the application robot.

Executing the application process may comprise performing the fifth function, that is simulating the steps of the first imaginary user using the GUI of the further application process. This may be realized by calling the fifth program 25 when the first program 21 is executed by the application robot. The fifth program 25 may be stored in the first function memory 115.

The virtual workstation may comprise all the hardware elements of the first computer system 100 shown in FIG. 2 in the form of virtual hardware elements, e.g. a virtual processor, a virtual memory comprising a virtual function memory containing the first program 21, the fourth program 24, the fifth program 25 and preferably the third program 23, a virtual I/O circuitry, a virtual bus, a virtual storage device and a virtual network interface.

Setting up the virtual workstation may be just one possible embodiment. In another example, the first program 21, the fourth program 24, the fifth program 25 and preferably the third program 23 may be executed on the first processor 102 as described above and below without setting up the virtual workstation on the first processor 102.

According to a first example, the further application process may be executed on the first processor 102, preferably on the virtual workstation. In this first example, the first function memory 115 may also comprise the third program 23. The third program 23 may be an application program for processing industrial data such as SAP as mentioned above. By executing the third program 23 on the first processor 102 the further application may be performed and data stored within the third security zone may be processed on the first processor 102, preferably on the virtual workstation. The data may be industrial data as mentioned above. The second network 12 may be regarded as a serving network serving to users of the third network 13. Hence, the data is referred to as client data in the following. In order to process the client data on the first computer system 100, the application robot may execute the first program 21 including simulating the steps of the first imaginary user using the GUI of the further application process.

Executing the first program 21 and preferably the fifth program 25 may comprise performing a login into the third computer system 140 from the first computer system 100 via the first connection 151 for retrieving the client data from the third security zone 3. The third computer system 140 may execute the third program 23 for executing the further application process as well for enabling a first data traffic of the industrial data between the third security zone 3 and the first security zone 1. The third memory 143 may comprise a third function memory 155 storing the third program 23 for executing the further application process on the third processor 142. Running the further application process on the first processor 102 and on the third processor 142 may be advantageous for realizing the first data traffic as equal data structures may be used by the third program 23 executed on the third processor 142 and on the first processor 102. The third computer system 140 may be configured as a server serving to client computer systems of the third network 13 not shown in FIG. 1.

According to a second example, a front end application of the further application process may be executed on the first processor 102, preferably by executing the third program 23 or a subroutine of the third program 23 on the first processor 102. The third program 23 or its subroutine may comprise instructions for executing functions of the GUI of the further application process.

The third program 23 and preferably its subroutine may be run on the first processor 102 in the first example as well as in the second example for executing the GUI of the further application process on the first processor 102.

The term "executing the GUI of the further application process on the first processor 102" as used herein may comprise running the third program 23 and/or its subroutine for setting up the GUI of the further application process on the first processor 102. Setting up the GUI of the further application process may comprise an activation of at least one input function of that GUI for reading user input data. The input function may be able to read in the user input data independently from a source of the user input data.

The fifth program 25 may be run in parallel to the third program 23 and/or its subroutine on the first processor 102. The fifth program 25 may create output signals simulating mouse output data and/or keyboard output data and send the output signals to the input function. Sending the output signals to the input function may be one example of the application process interacting with the further application process. The input function may read in the output signals and process the output signals similarly to the above mentioned user input data. The mouse output data and/or the keyboard output data may be recorded when the user of the third network 13 uses the further application process on one of the devices of the third network 13 or the second network 12. By running the fifth program 25 and the third program 23 and/or its subroutine in parallel and sending the output signals to the input function the steps of the first imaginary user, for example the user of the third network 13, using the GUI of the further application process may be simulated.

The steps of the first imaginary user may comprise entering entry data in a field of the GUI of the further application process, checking a box of the GUI of the further application process or any other usage of the GUI of the further application process. A recording of the mouse output data and/or keyboard output data may be performed using one of the robot process automation programs before running the fifth program 25. The entry data may comprise access information providing access to the further application being executed on the third processor 142 by running the third program 23 on the third processor 142.

By executing the fifth program 25 and the third program 23 and/or its subroutine on the first processor 102 input data for the further application process, which may be executed on the third processor 142, may be generated for getting processed on the third processor 142. The fifth program 25 may be initiated by executing the first program 21 on the first processor 102. The input data may be transferred to the third computer system 140 by establishing a second data traffic between the third security zone 3 and the first security zone 1. For establishing the second data traffic, the application robot may log into the third computer system 140 via the first connection 151 for transferring the input data to the third security zone 3. The input data may be processed by the third program 23 on the third computer system 140 within the third security zone 3. Generating the input data as described above and processing the input data by the third program 23 on the third computer system 140 may be one example, wherein the further application process is operated on the third computer system 140 and the further application process is controlled by the GUI of the further application process.

The application robot may log into the third computer system 140 using the access information, which may be included in the entry data. The access information may be stored on the storage device 4 or a second storage device 6 being arranged within the second security zone 2. The access credentials and/or the access information may be stored cryptographically secured within the second security zone either on the storage device 4 or the second storage device 5. Storing the access credentials on the storage device 4 and storing the access information on the second storage device may increase the security.

The entry data, the output signals or the input data may theoretically become visible by logging into the first computer system 100 from another computer comprising a screen and initiating a shadow session. However, the firewall 5 may be configured such that the login on the first computer system 100 may only be executed from the second computer system 120. This may comprise that an interactive login into the first computer system 100 being executed from the first security zone 1 is disabled. This may prevent the possibility to log into the first computer system 100 from any device of the first network 11.

The second memory 123 may comprise a space for storing the sixth program 26. The sixth program 26 may be a remote desktop application. The sixth program 26 may trigger an application of a first communication protocol for sending control data from the second network interface 125 to the first network interface 105 via the second connection 152. The first communication protocol may be the remote desktop protocol. From the first network interface 105 the control data may be sent via the first bus 106 to the first processor 102 and may be processed by the first processor 102. By processing the control data, the first processor 102 may be controlled by the control data. The control data may be generated by the second processor 122 and sent via the second bus 126 to the second network interface 125. The control data may comprise the access credentials and/or communication data for setting up a communication between the first computer system 100 and the second computer system 120.

In a first example, the control data may be generated by processing keyboard input signals via the second I/O circuitry 124. The keyboard input signals may be generated by a user of the second network 12 typing in the access credentials. In a second example, the control data may be generated automatically by executing a login robot. In this second example, the login robot simulates steps of a second imaginary user, i.e. the user of the second network 12, executing the login into the first computer system 100 from the second computer system 120. The steps of the second imaginary user may include typing in the access credentials using the keyboard. In this example the keyboard is not needed.

When executing the sixth program 26 the access credentials may be verified by comparing the access credentials with first verification data. The first verification data may comprise a copy, preferably an encrypted copy, of the access credentials.

In a first example, the first verification data may be stored, preferably cryptographically stored, within the first security zone 1, for example on the first storage device 107. In that first example, the access credentials may be compared with the first verification data by the first processor 102.

In a second example, the first verification data may be stored within the second security zone 2, for example on the second storage device 127 or a further storage device of the second network 12 not shown in FIG. 1, and may be compared with the access credentials by the second processor 122. This has the advantage that neither the access credentials nor the first verification data need to be stored outside the second security zone 12, thus reducing the risk of performing a login into the first computer system 100 from outside the second security zone 2.

The control data being processed by the first processor 102 may trigger a generation of feedback data by the first processor 102. The feedback data may comprise confirmation data and/or the first verification data. In the latter case the first computer system 100 may sent the first verification data to the second computer system 120 and the second processor 102 may compare the access credentials with the first verification data. This is advantageous as the access credentials may not need to be sent to the first security zone 1 and may remain within the second security zone 2. Preferably the first verification data may be encrypted with a public key of the second security zone 2. The second processor 102 may decrypt the first verification data by using a private key of the second security zone 2. The private key of the second security zone 2 may be stored in the storage device 4 and may be sent on request to the second computer system 120.

The confirmation data may contain information triggering an initialization of a communication between the first computer system 100 and the second computer system 120. The first processor 102 may use the sixth program 26 for generating the feedback data. The feedback data may be sent from the first processor 102 via the first bus 106 to the first network interface 105 and may be sent from the first network interface 105 to the second network interface 125 using the first communication protocol. The feedback data may be sent from the second network interface 124 to the second processor 122 via the second bus 126.

The above described exchange of the control data and the feedback data between the second computer system 120 and the first computer system 100 using the access credentials may enable the login from the second computer system 120 into the first computer system 100. The login form the second computer system 120 into the first computer system 100 may be successfully realized by a successful comparison of the access credentials and the first verification data. Such a comparison may be performed by the first processor 102 or the second processor 122. In the latter case the method may reduce the risk of performing a login into the first computer system 100 from outside the second security zone 2. In response to a successfully realized login from the second computer system 120 into the first computer system 100 the application process may be started by sending a starting command from the second computer system 120 to the first computer system 100.

The firewall 5 may be configured such that the first computer system 100 may only be able to process data being transferred via the first communication protocol if the data is sent from the second computer system 120. In this example, the firewall 5 may be associated with settings of the first OS 128 restricting the first computer system 100 such that it can only process data being transferred via the first communication protocol if the data is sent from the second computer system 120. Therefore, the firewall 5 may be arranged within the first computer system 100. FIG. 1 shows the firewall 5 arranged between the first security zone 1 and the second security zone 2. As FIG. 1 is a block diagram, the position of the firewall 5 in FIG. 1 only represents a functional position not a physical position.

In the following example it is described how the login from the second computer system 120 into the first computer system 100 may be performed by the login robot. In this example, the login robot may generate the control data automatically.

The second memory 103 may comprise a space for storing the program 201; the space hereinafter referred to as second function memory 135. The program 201 may be generated by using at least a subroutine, a library and/or a module of one of the above mentioned robot process automation programs. The OS 128 may comprise a second executable program code of one of the robot process automation programs for executing the program 201.

Furthermore, the second function memory 135 may comprise the program 204. The second processor 122 may execute the program 204. Executing the program 204 may comprise starting and executing the login robot on the second processor 122, wherein executing the login robot may comprise executing the login automation process by the login robot. In order to execute the login automation process, the login robot may execute the program 201. To realize this, the second processor 122 may execute the program 201. The login robot may be regarded as an application entity comprising the second computer system 120 and the program 201 being executed on the second computer system 120. According to one example, the program 204 may be in the form a shell script or any other set of instructions for starting and executing the login robot.

Executing the login automation process may comprise performing the function 205, that may be simulating the steps of the second imaginary user using an interface, preferably a GUI, of the remote login application. This may be realized by calling the program 205 when the program 201 is executed by the login robot. The program 205, 201, 204 may be stored in the second function memory 135.

When the login robot may be executed by the second processor 122, the program 203 may be executed on the second processor 122. The program 203 may comprise instructions for executing functions of the GUI of the remote login application on the second processor 122.

The term "executing the GUI of the remote login application on the second processor 122" as used herein may comprise running the program 203 and/or its subroutine for setting up the GUI of the remote login application on the second processor 122. Setting up the GUI of the remote login application may comprise an activation of at least one second input function of that GUI for reading second user input data. The second input function may be able to read in the second user input data independently from a source of the second user input data.

The program 205 may be run in parallel to the program 203 and/or its subroutine on the second processor 122. The program 205 may create second output signals simulating second mouse output data and/or second keyboard output data and send the second output signals to the second input function. The second input function may read in the second output signals and may process the second output signals similarly to the above mentioned second user input data. The second mouse output data and/or the second keyboard output data may be recorded when a second user of the second network 12 uses the remote login application on one of the devices of the second network 12. By running the program 205 and the program 203 in parallel and sending the second output signals to the second input function the steps of the second imaginary user, for example the user of the second network 12, using the GUI of the remote login application may be simulated. Furthermore, sending the second output signals to the second input function may be one example how the login automation process may interact with the remote login application.

The steps of the second imaginary user may comprise entering the access credentials in a field of the GUI of the remote login application. A recording of the second mouse output data and/or second keyboard output data may be performed using one of the robot process automation programs before running the program 205.

The remote login application may comprise a network level authentication procedure. This may further reduce the risk that a login into the first computer system 100 from outside the second security zone may be performed.

Figure 3:
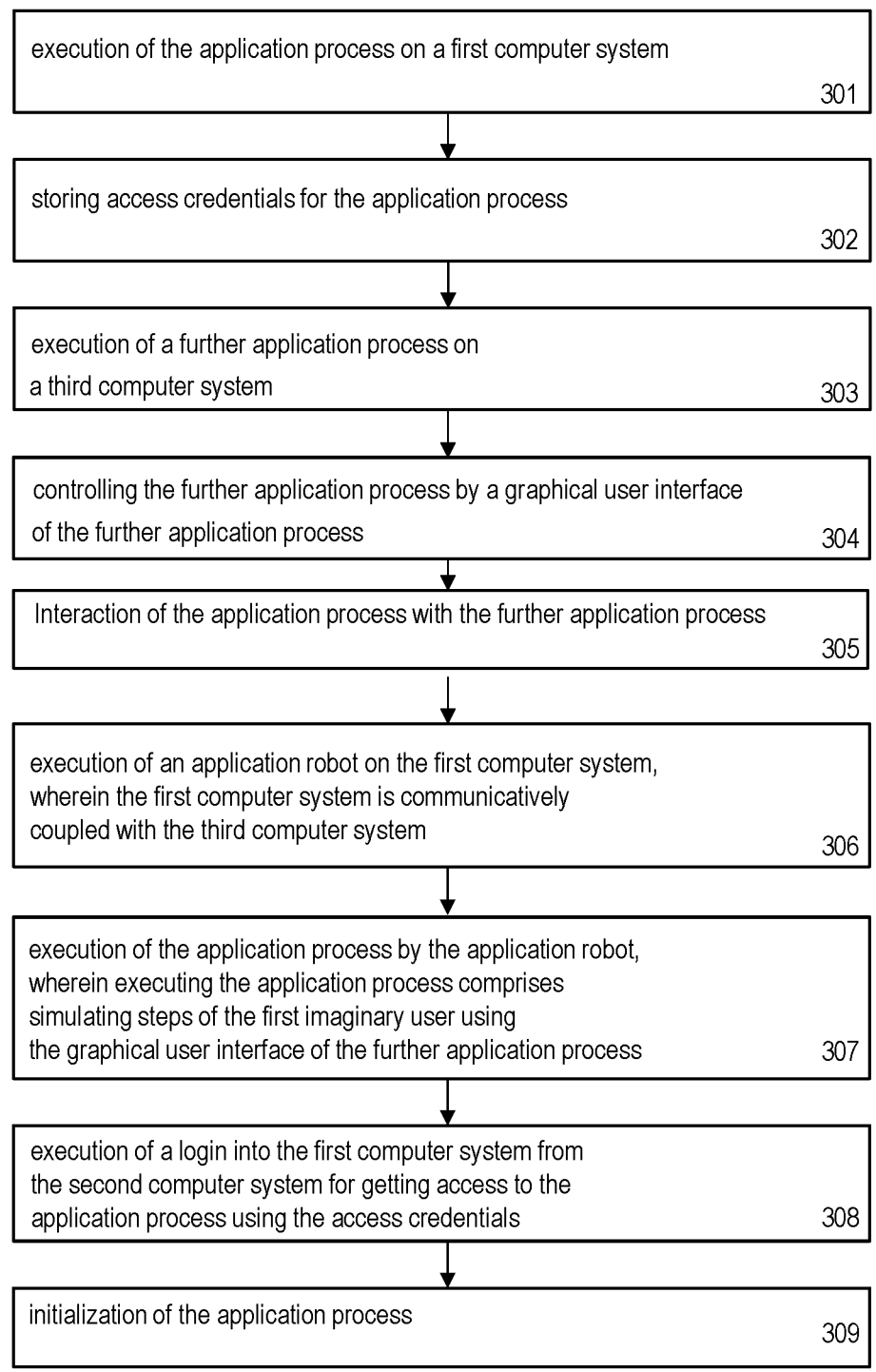
FIG. 3 shows a flowchart of a method for executing a login into the first computer system as shown in FIG. 2 from the second computer system as shown in FIG. 2.

FIG. 3 is a flowchart of a method for executing the login into the first computer system 100 from the second computer system 120. The method may comprise the following operations or functions.

In block 301, the application process on the first computer system 100 may be executed, the first computer system 100 being arranged within a first security zone 1.

In block 302, the access credentials for the application process may be stored in the storage device 4.

In block 303, the further application process may be executed on the third computer system 140.

In block 304, the further application process may be controlled by the graphical user interface of the further application process as described above.

In block 305, the application process may interact with the further application process as described above.

In block 306, the application robot may be executed on the first computer system 100 as described above, wherein the first computer system 100 is communicatively coupled with the third computer system 140.

In block 307, the application robot may execute the application process, wherein executing the application process comprises simulating steps of the first imaginary user using the graphical user interface of the further application process as described above.

In block 308, the login into the first computer system 100 from the second computer system 120 may be executed for getting access to the application process using the access credentials. The login may be executed automatically by the login robot as described above.

In block 309, the application process may be initialized. For example, the application process may be initialized by sending the starting command from the second processor 122 to the first processor 102. The numbering of the steps or functional blocks does not prescribe an order of execution of the steps. Preferably the step 309 may be executed before executing the steps 301, 302, 303, 304, 305, 306, 307, 308.

Step 301 and step 303 may be executed preferably in parallel in order to enable an easy and time-saving interaction between the application process and the further application process. A sequential execution of step 301 and step 303 may be possible, but may be more time-consuming. Step 302 may be performed during an execution of all other steps 301, 303, 304, 305, 306, 307, 308, 309.

In one example, a secure connection between the second computer system 120 and the first computer system 100 may be established. The access information may be provided to the first computer system 100 using the secure connection. The access information may provide access to the further application process. In response to receiving the access information, the application robot may simulate the steps of the first imaginary user using the graphical user interface of the further application process and perform a login into the further application process using the access information. Within the first security zone the access information may only be received from the second security zone via the secure connection. The secure connection may be provided by the remote desktop application. For example, the secure connection may comprise the first communication protocol mentioned above. In this case, the access information may be sent using the first communication protocol.

In another example, the login robot may be started via a jump server 7. The jump server 7 may be arranged within the first security zone 1 and communicatively coupled via a further secure connection 8 between the first security zone 1 and the third security zone 3 and may be accessible from the third security zone 3 via the further secure connection 8. The further secure connection may be a VPN-connection. For example, the user of the third network 13 may log into the jump server 7 from a workstation 9 of the third network 13. In response to a login on the jump server 7 the user of the third network 13 may have access to certain functions of one of the robot process automation programs, wherein one of that function may be a control function.

The control function may enable the user of the third network 13 to start the login robot via the jump server 7. To realize this a robot starting command may be send from the jump server 7 to the second computer system 120.

In another example, the run script may be controlled, preferably started, via the jump server 7. The run script may be programmable and/or controllable by the user of the third network 13 being logged in the jump server 7. For example, the run script may be programmed such that executing the login into the first computer system 100 from the second computer system 120 and executing the application robot are scheduled in the queue. The run script may also comprise an initialization command for starting the second application robot on the fourth computer system not shown in FIG. 1. Preferably, executing the login into the first computer system 100 and executing the login into the fourth computer system are scheduled via the run script. These two different logins may be executed in parallel. The second access credentials for accessing the fourth computer may be stored on the storage device 4. By starting the run script, the user of the third network 13 may start the further application process and the second further application process without logging into the first computer system 100 and without logging into the fourth computer system.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method, the method comprising:
    executing an application process on a first computer system, the first computer system being arranged within a first security zone;
    storing access credentials for the application process in a storage device, the storage device being arranged within a second security zone and the first security zone and the second security zone being communicatively coupled via a firewall, wherein the first security zone is communicatively coupled with a third security zone and the application process interacts with a further application process, executing the further application process on a third computer system, the further application process being controlled by a graphical user interface of the further application process, the third computer system being arranged within the third security zone;
    executing an application robot on the first computer system, wherein the first computer system is communicatively coupled with the third computer system, the application robot executing the application process, wherein executing the application process comprises simulating steps of a first imaginary user using the graphical user interface of the further application process; and
    executing a login into the first computer system from a second computer system for getting access to the application process using the access credentials, the second computer system being arranged within the second security zone, wherein by getting access to the application process the application process can be initialized.

2. The method of claim 1, wherein the firewall is configured such that the login on the first computer system can only be executed from the second computer system.

3. The method of claim 1, wherein the login is performed by a login robot, the login robot simulating steps of a second imaginary user executing the login into the first computer system from the second computer system.

4. The method of claim 1, wherein the application process comprises a graphical user interface.

5. The method of claim 1, wherein the application process comprises a graphical user interface and the login is performed by a login robot, the login robot simulating steps of a second imaginary user executing the login into the first computer system from the second computer system, the login robot obtaining access to the graphical user interface of the application process and initializing the application process using the graphical user interface of the application process.

6. The method of claim 1, further comprising:
    establishing a secure connection between the second computer system and the first computer system and providing access information to the first computer system using the secure connection, the access information providing access to the further application process and in response to receiving the access information, the application robot simulating the steps of the first imaginary user using the graphical user interface of the further application process performing a login into the further application process using the access information, wherein within the first security zone the access information can only be received from the second security zone via the secure connection.

7. The method of claim 1, wherein the first computer system is realized as a dedicated application server.

8. The method of claim 1, wherein the third computer system is realized as a non-dedicated application server.

9. The method of claim 1, wherein the second security zone and the third security zone are only communicatively coupled indirectly via the first security zone.

10. The method of claim 1, wherein an interactive login into the first computer system being executed from the first security zone is disabled.

11. The method of claim 3, wherein executing the login and executing the application robot are scheduled in a queue via a run script, the run script being executed within the first security zone, wherein executing the run script provides an execution of the login followed by an execution of the application robot.

12. The method of claim 1, further comprising:
executing a second application robot on a fourth computer system, the fourth computer system being arranged within the first security zone and communicatively coupled with a fifth computer system, the second application robot executing a second application process, wherein executing the second application process comprises using a graphical user interface of a second further application process and simulating steps of a further first imaginary user using the graphical user interface of the second further application process, the second further application process being operated on the fifth computer system and the second further application process being controlled by the graphical user interface of the second further application process, the fifth computer system being arranged in the third security zone, executing a login into the fourth computer system for getting access to the second application process, wherein by getting access to the second application process the second application process can be initialized, wherein the login into the fourth computer system is performed by a second login robot from the second security zone using second access credentials, the second login robot simulating steps of a further second imaginary user executing the login into the fourth computer system, wherein executing the login into the first computer system and executing the login into the fourth computer system are scheduled via a run script and the second access credentials are stored within the second security zone.

13. The method of claim 3, further comprising:
starting the login robot via a jump server, the jump server being arranged within the first security zone and communicatively coupled via a further secure connection between the first security zone and the third security zone and being accessible from the third security zone via the further secure connection for starting the login robot via the jump server.

14. The method of claim 11, further comprising:
controlling the run script via a jump server, the jump server being arranged within the first security zone and communicatively coupled by a further secure connection between the first security zone and the third security zone and being accessible from the third security zone via the further secure connection for controlling the run script via the jump server.

15. The method of claim 4, further comprising:
storing access information cryptographically secured within the second security zone.

16. The method of claim 3, further comprising:
executing a login into the login robot using login robot access credentials, wherein the login robot is only accessible by using the login robot access credentials and the login robot access credentials are stored within the second security zone.

17. A computer program product comprising a computer readable storage medium having program instructions embodied therewith, the program instructions executable by a computer to cause the computer to:

execute, by the computer, an application process on a first computer system, the first computer system being arranged within a first security zone;
store, by the computer, access credentials for the application process in a storage device, the storage device being arranged within a second security zone and the first security zone and the second security zone being communicatively coupled via a firewall, wherein the first security zone is communicatively coupled with a third security zone and the application process interacts with a further application process, executing the further application process on a third computer system, the further application process being controlled by a graphical user interface of the further application process, the third computer system being arranged within the third security zone;
execute, by the computer, an application robot on the first computer system, wherein the first computer system is communicatively coupled with the third computer system, the application robot executing the application process, wherein executing the application process comprises simulating steps of a first imaginary user using the graphical user interface of the further application process; and
execute, by the computer, a login into the first computer system from a second computer system for getting access to the application process using the access credentials, the second computer system being arranged within the second security zone, wherein by getting access to the application process the application process can be initialized.

18. A system, comprising:
a computer system comprising: a computer processor, a computer-readable storage medium, and program instructions stored on the computer-readable storage medium being executable by the processor, to cause a computer system to:
execute an application process on a first computer system, the first computer system being arranged within a first security zone;
store access credentials for the application process in a storage device, the storage device being arranged within a second security zone and the first security zone and the second security zone being communicatively coupled via a firewall, wherein the first security zone is communicatively coupled with a third security zone and the application process interacts with a further application process, executing the further application process on a third computer system, the further application process being controlled by a graphical user interface of the further application process, the third computer system being arranged within the third security zone;
execute an application robot on the first computer system, wherein the first computer system is communicatively coupled with the third computer system, the application robot executing the application process, wherein executing the application process comprises simulating steps of a first imaginary user using the graphical user interface of the further application process; and
execute a login into the first computer system from a second computer system for getting access to the application process using the access credentials, the second computer system being arranged within the second security zone, wherein by getting access to the application process the application process can be initialized.

* * * * *